Feb. 10, 1931.   H. E. BUCKLEN ET AL   1,792,212
IMPELLER
Filed Feb. 16, 1927   2 Sheets-Sheet 2

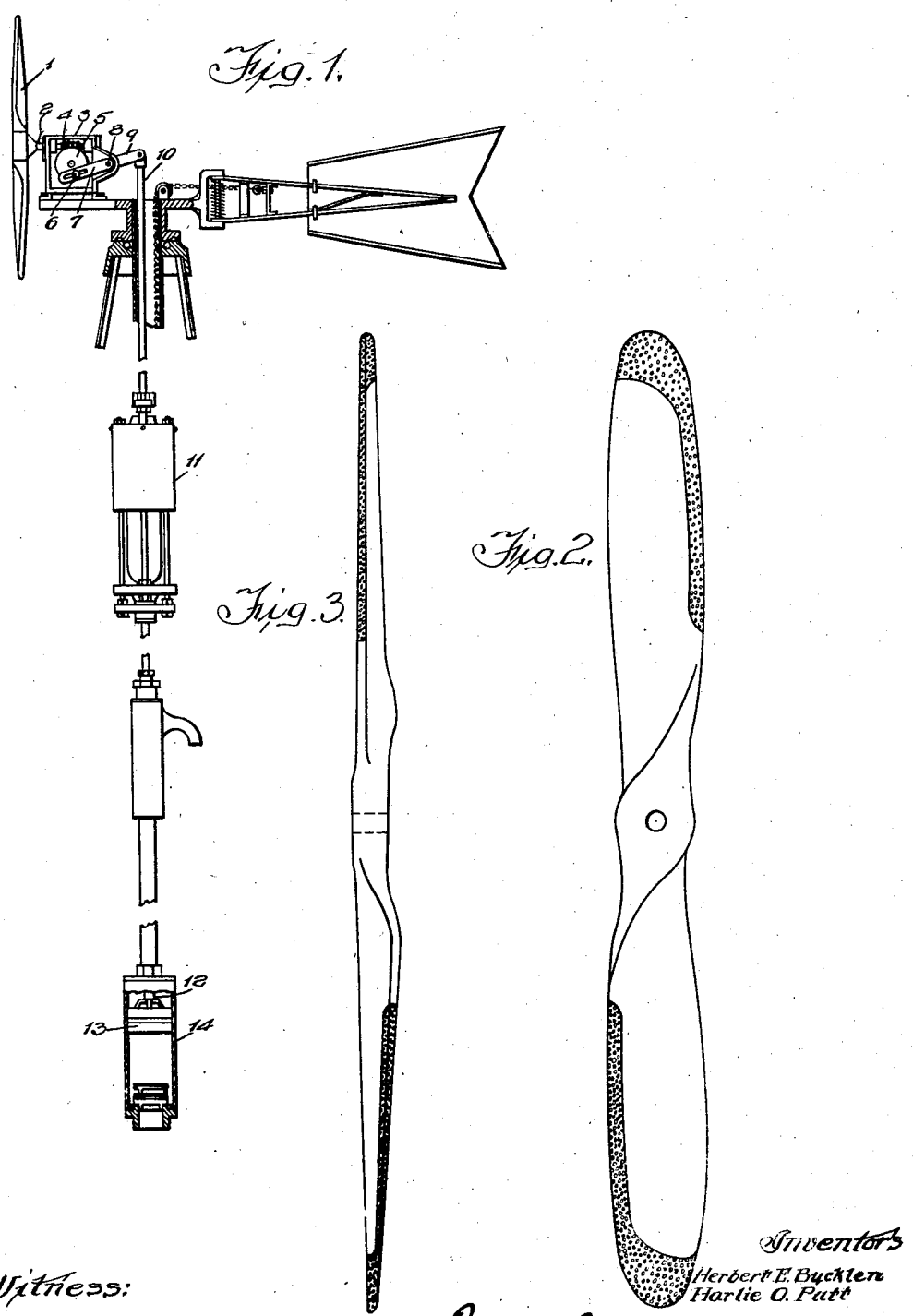

Witness:
William P. Kilroy

Inventors:
Herbert E. Bucklen
Hartie O. Putt

Patented Feb. 10, 1931

1,792,212

UNITED STATES PATENT OFFICE

HERBERT E. BUCKLEN AND HARLIE O. PUTT, OF ELKHART, INDIANA, ASSIGNORS, BY DIRECT AND MESNE ASSIGNMENTS, TO HERBERT E. BUCKLEN CORPORATION, A CORPORATION OF INDIANA

IMPELLER

Application filed February 16, 1927. Serial No. 168,492.

The present invention relates to wind driven power plants and provides primarily a new form of wind driven impeller which is particularly useful for such work as operating a water pump, or driving a battery charging generator, or other suitable load.

The impeller is a two bladed stick, which superficially resembles, but fundamentally differs from, the well known aeroplane propeller. The novelty in the impeller resides in a new form and structure which profoundly affects the mode of operation. Whereas, the aeroplane propeller is driven by an engine of great power and is so shaped as to expend that power upon the air in which it travels, a wind driven impeller is responsive to the wind, and its purpose is to extract power from the variable wind currents in which it is placed.

This impeller is designed to cooperate with the other working parts of the power plant in order to get the desired characteristics of easy, break-away, or starting, at low speed of the wind and satisfactory power output without excessive rotative speed or wind pressure at higher wind velocity.

The superficial area of such an impeller exposed to the wind is very small, and while this is of great advantage in preventing destructive pressures due to high winds, such as occur in storms, it also makes starting of the impeller in low wind velocities much more difficult.

The speed at which such an impeller revolves in any given wind is far greater than the speed at which the well known multi-vane impellers of the prior art perform. Likewise, the amount of power which can be delivered by my impeller within the working range of wind velocities is far greater than the power that can be delivered by known multivane impellers. For practical reasons the working range of wind velocities is between about five miles per hour as a minimum and about twenty-five miles per hour as a maximum, the normal rate of wind velocities lies within these limits for most localities.

The impeller of our invention is essentially a helicoid stream line device moving in a fluid stream. It extracts power from the stream not by the static pressure of impact of the wind upon a large sail area as in devices of the prior arts, but essentially it moves in the fluid stream with minimum disturbance of the stream and gains its power at high angular velocity and low torque. The blades are so disposed in the fluid stream that the fluid stream flowing past these moving blades creates a pressure on the wind side and a suction on the lee side whereby torque is produced and the impeller rotated to deliver power.

In the connection of an impeller of the character herein disclosed to a load, it is desirable to permit the impeller to start rotating with a minimum load and thereafter applying the load as soon as the velocity attains a point where power may safely be extracted without materially hindering the rotation of the impeller. In the connection of our impeller to the driving of a water pump, we employ an unloader of the type disclosed in our co-pending application Serial No. 134,684, filed September 10, 1926, and in the connection of our impeller to an electric generator for charging storage batteries, and the like, an electrical cut-out is provided in circuit with the storage batteries whereby the electrical load is not imposed until the impeller has reached a speed such that the voltage developed at the terminals of the generator are sufficient to insure the delivery of power without stopping the impeller.

Furthermore, in order to permit the impeller to develop its proper rotative speed in connection with the operation of a water pump, we employ the worm gear reduction of from 12 to 1 to 24 to 1 revolutions of the impeller to one reciprocation of the pump rod as disclosed in the co-pending application of Herbert E. Bucklen, Serial No. 78,275 filed December 30, 1925, on wind mill drive.

It is an important practical aspect of our invention that a wind driven power plant of our invention presents such small surface to the wind that the plant will stand up in wind velocities which wreck the windmills of the prior art.

Now in order to acquaint those skilled in the art with the manner of constructing and operating a device embodying our invention, we shall describe in connection with the accompanying drawings a specific embodiment of the same.

In the drawings:

Figure 1 is a side elevational view of the impeller of our invention connected through a pump jack and unloader;

Fig. 2 is a front elevational view;

Fig. 3 is a side view; and

Figure 6:
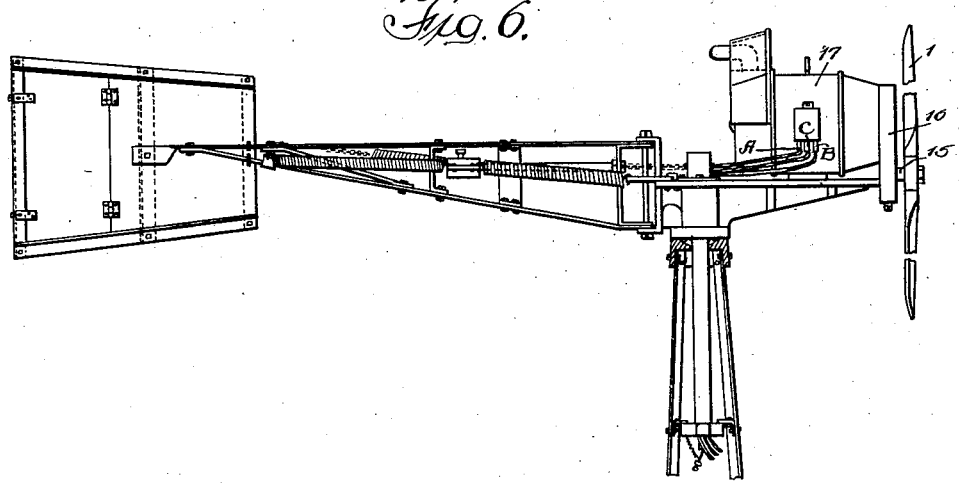
Fig. 6 is a side elevational view of an electric generator driven by the impeller of our invention.
Figure 4:
Fig. 4 is an end view of an impeller embodying our invention.

In the system shown in Figure 1 the impeller 1 of our invention is mounted on a shaft 2, which shaft forms part of a pumping jack 3, this pumping jack comprising a worm 4, a worm wheel 5, and a crank pin 6 on the worm wheel cooperating with a rocking lever, the inner arm 7 of which is slotted and cooperates with the crank pin. The arm 7 is connected to a rock shaft 8 extending out to the outside of the casing and this arm 9 is connected to the operating rod 10. The operating rod 10 is connected through the unloader 11 to the pump rod 12, which pump rod bears at its lower end the operating plunger 13 of the pump barrel 14.

These parts with the exception of the details of the impeller 1 are all described in the co-pending applications referred to and we make reference to them here for the purpose of explaining the problem which the impeller 1 encounters and solves.

Referring now to Figure 6, the impeller 1 is in this case mounted on the shaft 15, which extends into the gear case 16 where it has suitable bearing. A gear is mounted on said shaft 15 within the gear case 16 and it drives the pinion on the shaft of the generator 17, the gear ratio in this case being of the order of one rotation of the propeller shaft 15 to three rotations of the armature shaft of the generator 17.

The generator 17 is suitably connected through two battery wires A and B and a third control or field wire C to a storage battery system through a suitable relay or cutout, which is controlled by the voltage of the generator 17 to connect the generator leads to the battery when the voltage rises to a point where current may be delivered from the generator 17 to the battery without reducing the speed of the impeller 1 below that which will maintain the desired potential and without a hunting action.

The impeller 1, which we have successfully employed in power plants as above described and which is the subject matter of the present invention, comprises a central core or form upon which thin veneer ply wood is laid and firmly glued in place. The physical characteristics of the impeller as shown in Figures 2 to 5, inclusive, are as follows. The preferred size of the impeller for power plants above described is substantially 11 feet 6 inches in length and the width of blade runs from substantially 9 inches at the hub to approximately 8 inches at the outer station, the widest portion being at station II adjacent the hub.

For the purpose of laying out and describing the propeller the length of the blade is divided into five sections, which sections are taken at stations designated by the numerals I, II, III, IV, and V.

The width of the blade at point I is 9 inches, the width of the blade at point II is 11¼ inches, the width of the blade at point III is 11 inches, the width of the blade at point IV is 10 inches, while the width of the blade at point V is 8½ inches. The distance between the points I and II is 21 inches, between II and III—15 inches, between III and IV—13 inches, and between IV and V—12 inches. The length of the blade from the hub to the tip that is, between the points I and VI is 5 feet 9 inches.

We have found, from actual experience, that an impeller of this kind, when built with a 45 degree pitch and connected to a one-half horse power electric load will flex, at the tips, approximately one-third of an inch in a ten-mile per hour wind. This flexion will increase to a maximum of between three-fourths of an inch and seven-eighths of an inch in a twenty mile wind, the pitch changing to approximately 55 degrees as a result of this flexion.

Figure 5:
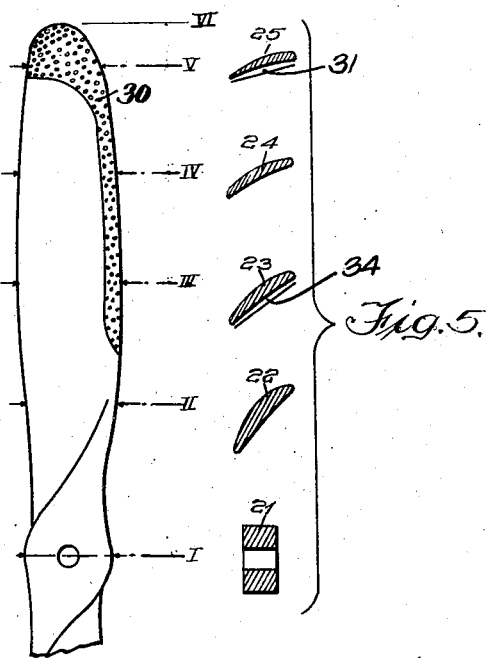
Fig. 5 is a series of sections taken on corresponding lines on Figure 2.

The section at the central part or hub is substantially rectangular as shown at 21 in Figure 5.

The over-all pitch of the impeller is, in the preferred form of the device, approximately 45 inches, although we find that anything within a range of 38 inch pitch to approximately 55 inch pitch may be advantageously employed. For general utility purposes the specific pitch which we have herein disclosed, namely, 45 inches for this size of propeller, appears to work to the best advantage. The statement that the propeller is 45 inch pitch means that if the propeller were permitted to travel in a solid medium it would advance axially 45 inches for one complete rotation.

Attention is called to the fact that the blade has camber. That is to say, the face of the blade is hollowed out on the forward side. We have found by experiment that this is advisable in order to give the propeller the necessary starting torque. This camber is of particular importance at the blade tips and is not so important adjacent the hub. The camber at the tip end is indicated by the reference number 31. It is to be noted that the amount of camber or the extent to which the face of the blade is hollowed out gradually decreases from the tip towards the hub. Thus at the section III the camber indicated at 34 is less than the camber at the tip end of the blade. The blade tips are the part of the impeller which give the impeller the necessary starting torque at low wind values, and they also produce a retardation of rotation of the impeller at high wind values, so that the impeller will perform more easily over its entire scale of operation or its operating range. The camber at the blade tips appears to reduce the air slip at the outer end of the blade when the impeller is standing still and to give it the necessary starting torque to break away under load or under the static friction of the operating parts.

We do not mean by the above that camber is not to be employed at the hub, but it is preferable to have camber throughout the entire length of the blade. It will be seen that the blade tips are most effective per unit of area in securing break away or starting due to their greater leverage upon the shaft to which the impeller is secured. We have experimented with impellers having camber and like impellers without camber. An impeller of the same relative dimension, area, and pitch, without camber, has a break-away when the wind velocity is approximately 12 to 14 miles per hour driving an electric generator as shown in Figure 6, whereas the impeller herein described and illustrated employing camber at the blade tips shows a break-away when the wind is at a velocity of from 9 to 10 miles per hour. The acceleration in variable winds is not so pronounced where the propeller has camber as it is where the propeller is without camber, because of the retarding effect which the camber has when the propeller is driven at a velocity of the tips greater than the corresponding wind velocity.

In the construction of this impeller the core is made of a light wood and then the sections of ply wood are applied to it and clamped in a mold or clamp and the sections of ply wood built up by gluing the same into place. This permits the proper contour, pitch, and camber to be secured without excessive machine work or carving, and it provides an impeller of light weight, the outer layers of wood being preferably of tough durable structure and requiring little hand finishing. The wood may be coated with a wood filler and suitable coats of varnish, preferably of cellulose composition or other non-hygroscopic varnish, or if desired, the surface of the impeller may be covered with a coating of aluminum or like metal applied in a spray of molten particles which enter the grain of the surface of the wood and key themselves effectively thereto providing a water tight, thin, metal coating which is highly durable and effective. Such coating is sufficiently flexible to comply with the requirements for the flexing of the blades, particularly at their tips when operated at high speed.

The forward edge and tip of the blade may be finished as indicated in Figures 2 and 3 by applying a metal sheath 30 of copper, aluminum, or like ductile metal to protect the edge and tip from accidental contact with particles of solid matter which might be borne by the wind or might accidentally be interposed in the path of the blade. The characteristic above mentioned, namely, that the tip of the impeller acts to steady the running of the impeller on high velocities, is of advantage to give a steadier running device, particularly where the impeller is employed to drive an electric generator, preventing excessive rushes of current, and also giving the angle tension governor, which is employed to govern the blowing of the impeller out of the wind, time to operate whether used in connection with a pump jack and pump rod or in connection with the driving of an electric generator. The blades of the impeller are sufficiently yielding to provide a general flexibility which adapts the device to its intended use. It permits a slight twisting and flexing of the blades so that the same may run more easily and to better advantage at higher speed, the tips flattening out into the plane of rotation to a greater extent than would be possible if the impeller were absolutely rigid and thereby providing less drag at high speed than would a rigid impeller. Considering the impeller as a helical screw this twisting of the blade causes the screw to uncoil to a certain extent, thereby changing the pitch of the impeller while permitting the impeller to continue to extract the power from the wind.

Since this impeller must operate at a high speed, as compared with the multivane wheels of the prior art, in order to extract the power of the wind current passing by it, the connection, that is, the gearing, in this case is so arranged as to permit the impeller to travel at a relatively high speed.

In the case of a pump jack the gear ratio between the shaft 2 and the pump rod is from approximately 12 to 1 to approximately 24 to 1, depending upon the pitch of the impeller and the rate of pumping which the particular pump can stand. With a 45 inch pitch and 12 to 1 ratio, the pump may be actuated at approximately 40 strokes per minute in a 25 mile wind dependent upon the size of the pump cylinder, the head of the water, and the like. The impeller travels about 720 revolutions per minute under these conditions. In the case of the electric generator, the gear ratio between the impeller shaft and the armature shaft is preferably 3 to 1, and on a 45 inch pitch impeller as above described operating in a 25 mile wind the speed of the armature shaft is approximately 1,000 R. P. M., the speed of the 45 inch pitch impeller being approximately 325 R. P. M.

With the impeller of our invention and the unloader 11 connected in the pump rod, preferably as near as possible to the pump jack 3, so as to reduce the load of the pump rod on idling, the impeller 1 will start rotating in wind velocity as low as 3 miles per hour. Below approximately 3 miles per hour there is insufficient power in the wind operating on the area of the impeller 1 to perform appreciable useful work, and the unloader disconnects the impeller so that the impeller idles, ready to take up power on increased velocity of the wind. If the wind drops as low as 2 miles per hour the impeller will stop due to insufficient power to overcome the friction of idling.

The characteristics of the impeller are, therefore, correlated with the gear ratio and the unloader.

The same thing is true in the electrical power plant where the characteristic of the impeller is correlated with the electrical characteristics of the generator and its unloader or cut-out relay.

Excessive speeds are prevented by the automatic blow-out feature explained in our co-pending application, Serial No. 116,752, filed June 17, 1926.

In operation, the impeller is required to meet two conflicting requirements. First, it must start with as much power as is possible in low wind and for this a relatively high or acute pitch angle is desirable so that a maximum pressure tangentially or peripherally would tend to develop. However, if the blade were made suitable for starting in low winds, then upon the occurrence of higher wind velocities the impeller could not speed up beyond a relatively low speed, because of the great resistance offered by the outer ends of the blades in being moved faster than the corresponding wind velocity.

On high speed a flat pitch angle, that is, a relatively low pitch, is desirable. These two contradictory requirements have been heretofore met merely by a compromised pitch, but in the present impeller we employ not a compromised pitch, but another characteristic of form and another characteristic of operation. The present impeller being flexible, a relatively low pitch is obtained at high wind speed due to the flexing or uncoiling of the impeller. The characteristic of form is the employment of camber on the blades, the forward surface being concaved and the rear surface being convex on each blade. That is to say the air current which drives the blade strikes the concave face. In aeroplane propellers driven by power, the concave face is on the side away from the oncoming current of air. In the impeller of our invention, the blade must lag behind the wind in order to get its torque whereas, in the aeroplane propeller, the blade must move faster than the wind in order to get its axial pull or thrust. The two devices are therefore fundamentally different both in structure and in mode of operation. It will be observed that the conditions which are supposed normally to prevail in an impeller of this type are completely reversed in the present structure in that we depend upon the blade tips for starting purposes instead of depending upon the intermediate or inner portion.

The blades themselves are flexible for twisting, and the camber which they have assists in making them so, with the result that when the impeller has been brought to a speed where it will deliver power, the blade tips are traveling faster than the corresponding velocity of the wind. They exert a drag upon the impeller, but due to the flexibility of the blade for twisting the blade tips begin to flatten out, that is, they uncoil to a certain degree, due to the wind pressure upon them, and trail with less resistance in the wind, so that the device may continue to deliver power at higher and higher wind velocities without inherent limitations which will prevent full realization of its capacity for delivering power within the permissible wind velocity. We believe that we are the first to provide an impeller which would start in as low a wind velocity as 4 miles per hour and deliver useful power down to 3 miles per hour, and continue to increase to deliver power without inherent limitations up to the maximum permissible wind velocity, instead of being unable to build up its power with increased velocity of the wind due to its own inherent limitations of design.

We do not intend to be limited to the details shown or described.

We claim:—

1. A wind driven power plant having power extracting means in the form of an impeller of the helical screw type adapted to be disposed in a current of wind comprising blades of narrow width relative to their length, free at their ends, and secured to a central hub, said impeller being of a diameter of the order of eleven feet, the width of the blades at the greatest part being of the order of eleven inches, the pitch of the blades being of the order of forty-five inches, the blades being cambered and sufficiently flexible at their tips to give a break-away at low wind velocities and to warp at high rotative speeds to diminish the friction of the tips through the wind when said tips are travelling at a rate higher than that corresponding to the wind velocity driving the impeller.

2. In a wind driven device a relatively long narrow impeller of the helical screw type adapted to be disposed in the wind and to be driven thereby, a power absorbing device operated by said impeller, said impeller being flexible and adapted to change its pitch under influence of wind pressure, said impeller being of a variable width and being widest at a point between the tip and the hub.

3. A helical screw flexible impeller adapted to be driven by the air currents in which it is placed, having blades of a helical shape and substantially rigid longitudinally, the tips of the blades being twisted by the pressure of the wind to decrease the pitch of the impeller on relatively high wind speeds.

4. An impeller adapted to be driven by the air stream in which it is disposed and to extract power therefrom, comprising a two bladed body substantially rigid longitudinally and having cambered blades with the convex face thereof disposed on the lee side of the fluid stream, said blades being relatively long and narrow and of varying width, the maximum width being at a point intermediate the hub and the tip of the blade.

5. A wind driven impeller blade for absorbing power from the wind, the tip end being shaped for maximum efficiency at low speeds and the intermediate portion being shaped for maximum efficiency at high speeds.

6. A wind driven impeller blade for absorbing power from the wind, the tip end being shaped for maximum efficiency at low speeds, and the intermediate portion being shaped for maximum efficiency at high speeds, the blade being flexible to permit twisting of the tip end under the pressure exerted by wind of a high velocity to decrease the efficiency of the tip end of the blade.

7. As an article of manufacture, a helical screw, wind driven, power impeller having a pitch between 38 inches and 55 inches.

8. As an article of manufacture, a helical screw, wind driven, power impeller wherein the ratio of the pitch to the diameter of the circle within which the impeller rotates lies between the limit of 2:7 and 2:5.

9. A flexible wind driven power impeller, said impeller having a blade widest at the point between the hub and the tip of the impeller and of a width at its widest point of the order of one-twelfth of the diameter of the circle described by the tip end of the blade, said impeller being concave on the windward side and convex on the leeward side and being thicker along one edge flexible to permit excessive wind pressure to distort the blade with reference to the thick edge to alter the pitch and alter the curvature of the tip end of the blade to reduce the efficiency of the tip end of the blade in extracting power from the wind.

10. A flexible wind driven impeller for extracting power from the wind, the tip end of the impeller being shaped for maximum efficiency at low wind speed and the intermediate portion of the impeller being shaped for maximum efficiency at higher wind speeds, and the impeller having a thick leading edge at the tip tapering to a thin trailing edge and being flexible to permit the pressure of the winds at excessive wind speeds to distort the tip end of the impeller and decrease the efficiency thereof whereby the intermediate portion of the impeller drives the tip end at a speed having an axial component greater than the speed of the wind.

11. A wind driven impeller having a cross section with a relatively thick leading portion at the tip terminating at the front thereof in a blunt edge and tapering into a sharp edge towards the rear, the said cross section being shaped to give the maximum efficiency at low wind speeds and being flexible about the thick edge to move the section of maximum efficiency inward from the tip towards the hub upon increasing winds.

12. A wind driven impeller having a cross section with a relatively thick leading portion at the tip terminating at the front thereof in a blunt edge and tapering into a sharp edge towards the rear, the said cross section being shaped to give the maximum efficiency at low wind speeds and being flexible about the thick edge to move the section of maximum efficiency inward from the tip towards the hub upon increasing winds, the tip end of the wing being twisted by high winds to give the same a negative efficiency whereby the tip end acts as a drag on the wing.

13. A wind driven power impeller having a blunt leading edge, the side of the impeller facing the wind having camber, the amount of camber being a maximum adjacent the tip end of the blades and gradually decreasing towards the hub.

In witness whereof, we hereunto subscribe our names this 10th day of February, 1927.

HERBERT E. BUCKLEN.
HARLIE O. PUTT.